March 4, 1924.                                                                 1,485,864

H. F. MARANVILLE

TIRE BEAD AND METHOD OF MAKING SAME

Filed Dec. 15, 1919        2 Sheets-Sheet 1

Inventor
Harvey F. Maranville
By Hull Smith Brock & West
Attys

March 4, 1924.

H. F. MARANVILLE 1,485,864

TIRE BEAD AND METHOD OF MAKING SAME

Filed Dec. 15, 1919    2 Sheets-Sheet 2

Inventor
Harvey F. Maranville
By Hull Smith Brock & West
Attys

Patented Mar. 4, 1924.

1,485,864

UNITED STATES PATENT OFFICE.

HARVEY F. MARANVILLE, OF AKRON, OHIO, ASSIGNOR, BY MESNE ASSIGNMENTS, TO THE FIRESTONE TIRE AND RUBBER COMPANY, OF AKRON, OHIO, A CORPORATION OF OHIO.

TIRE BEAD AND METHOD OF MAKING SAME.

Application filed December 15, 1919. Serial No. 344,820.

*To all whom it may concern:*

Be it known that I, HARVEY F. MARANVILLE, a citizen of the United States, residing at Akron, in the county of Summit and State of Ohio, have invented a certain new and useful Improvement in Tire Beads and Methods of Making Same, of which the following is a full, clear, and exact description, reference being had to the accompanying drawings.

This invention relates to pneumatic tires and has for its objects the provision of a new and improved bead and bead material therefor and also a new method of producing such bead and bead material. A great many different substances and constructions have been employed for these beads, such as woven wire, braided wire, twisted wire, cable, and even solid rods, the various wires, strands, etc., being frequently held in place (or supposed to be held in place) by being submerged in a suitable rubber composition. Considerable flexibility is necessary in devices of this character to permit the insertion and removal of the inner tubes and to enable the attachment and detachment of the rims. The rubber composition employed is harder than that employed in the body of the casing, being made as stiff as possible without unduly impeding the minimum flexibility of the beads required for working the tire, but despite this the wires frequently work loose and change their position, thus shortening the life of the tire. Furthermore the braided, twisted, woven and otherwise fabricated bead materials are extremely expensive.

The objects of my invention are the provision of a new, improved, and simplified bead which shall be easy to make, inexpensive in construction, sufficiently flexible for convenient use, and safe from changing its shape or working out of the tire; the provision of a new, improved, and simplified bead material; the provision of a new, improved, and simplified mode of making tire beads; while further objects and advantages of my invention will become apparent as the description proceeds.

Figure 1:
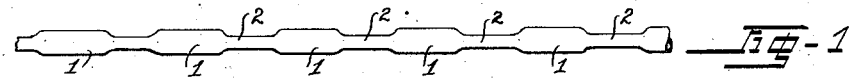
Figure 2:
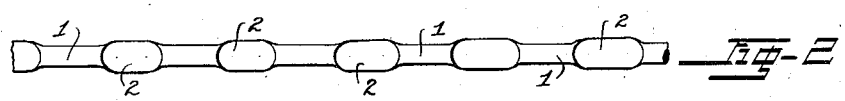
Figure 3:
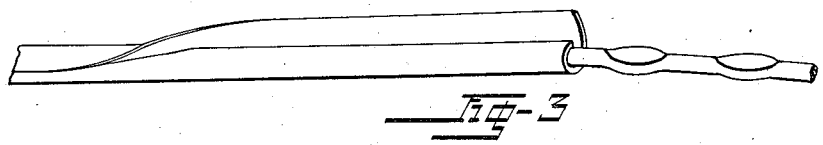
Figure 4:
Figure 5:
Figure 7:
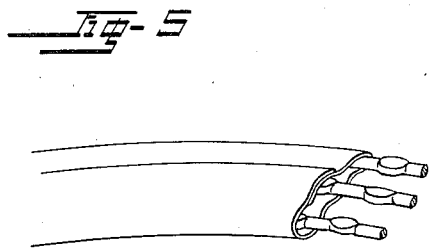
Figure 6:
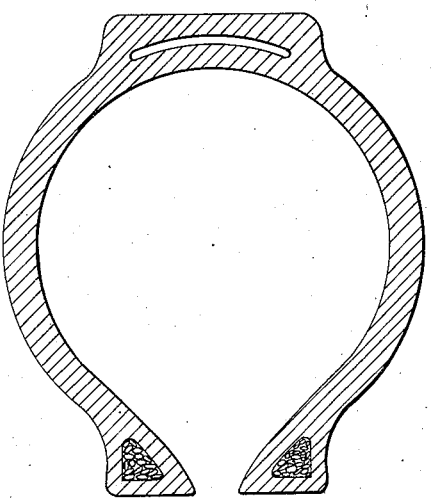
Figure 8:
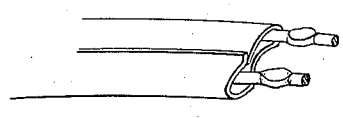

In the drawings accompanying and forming a part of this application I have illustrated certain embodiments of my said invention, both process and structure, but without intent to show all the physical forms in which my inventive idea can be embodied which indeed are very numerous. In these drawings, Figs. 1 and 2 are views showing a short section of my improved bead-wire taken at right angles to each other; Fig. 3 is a detail view illustrating the step of wrapping the wire; Fig. 4 is a detail view showing the step of winding the wires together after such wrapping; Fig. 5 is a cross sectional view of the finished bead together with an external wrapping; Fig. 6 is a cross sectional view of a completed tire casing embodying my improved beads; and Figs. 7 and 8 illustrate modified forms of my invention wherein the wires are originally wrapped otherwise than singly.

Figure 9:
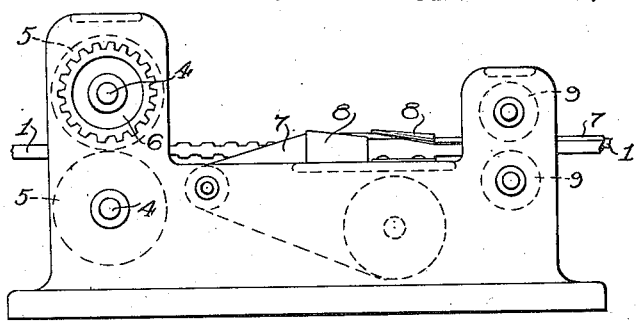
Figure 10:
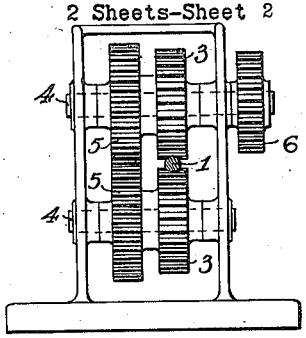
Figure 11:
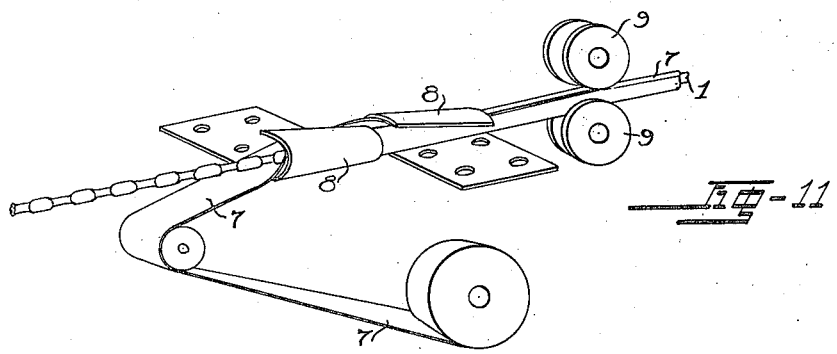
Figure 14:
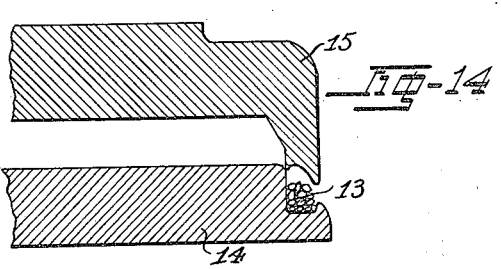
Figure 12:
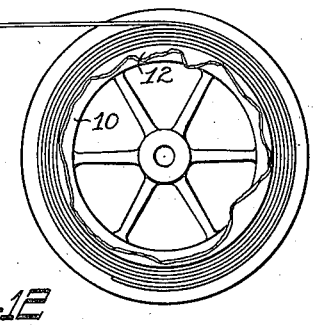
Figure 15:
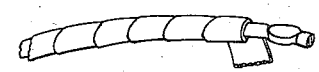
Figure 13:
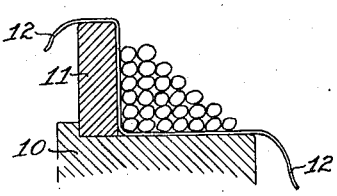

Fig. 9 is a side elevation and Fig. 10 an end elevation of a simple machine for beading the wire and for wrapping the same; Fig. 11 is a perspective view showing the step of wrapping the single beaded wire; Fig. 12 is a side elevation and Fig. 13 a cross section of a winding form upon which the covered wire is laid; Fig. 14 illustrates the step of forming the resulting hoop into the desired shape and Fig. 15 illustrates a reinforcing wire with a spiral winding.

It is the essence of my invention that instead of employing wires of uniform cross-section I employ a wire of a non-uniform cross section; and that as against employing a wire which is crimped, corrugated, twisted, or otherwise deflected as to its axis I employ one having an undeflected axis and an irregular exterior. The exterior irregularities of the wire enable the same to become bedded immovably against the adjacent wires and also firmly gripped by the materials in which they are submerged or embraced, while the fact that the axes of the wires are not deflected safe-guards the bead against any elongation other than by the actual stretching of those wires, and avoids distension by reason of a straightening or changed position of the same.

According to the preferred form of my invention, this external irregularity of the wire is produced by flattening spaced sections of the same but without displacing those flattened portions out of alignment with the intermediate portions. All the flattened portions can be flattened in the same plane or not as fancy indicates. This flattening can be done by hand, but it is more easily affected by running the wire between suitably toothed wheels or rollers in which the teeth do not intermesh but approach closely the surface of the opposite wheel so as to compress spaced portions of the wire. In their simplest form these wires consist of rounded portions 1—1 separated by flattened portions 2—2, as shown in Figs. 1 and 2.

Figs. 9 and 10 show a simple mechanism whereby this flattening can be effected, 3—3 representing a pair of corrugated wheels or rolls mounted on shafts 4—4 which are so journaled that the teeth of the corrugations approach sufficiently close to flatten the wire 1, and 5—5 a pair of intermeshing gears rigid with those wheels and serving to keep the teeth of each opposite the teeth of the other, driving being effected by means of a gear 6. The beaded wire is then wrapped with tape 7 which has previously been impregnated with a suitable rubber composition, this action being preferably performed by drawing the tape and wire through suitable dies 8—8 as shown in Figs. 9 and 11 after which the tape is pressed into close contact with the wire by suitable rolls 9—9. The tape may however be wound spirally as shown in Fig. 15.

The wrapped wire is then wound on a form 10 as shown in Fig. 12, said form having a rearward stop flange 11. Preferably the wires are wound in layers of constantly decreasing number of turns so as to approximate the desired bead shape, without the use of any special fillers, although it is not imperative to give the winding any especial shape in this operation since the succeeding operation will do this; however I prefer to lay the wires rather carefully as they are wound. Prior to beginning the winding a strap of rubberized fabric 12 is preferably (but not necessarily) applied to the form 10 so as to project sideways in both directions and the wire wound on top of it. When a sufficient number of turns have been laid the wire is severed and the flaps of this fabric folded inwardly so as to encase the wires and hold them in place. As I have intimated this fabric can be omitted and the adhesion of the separate wire coatings relied upon to hold the wires in place, but even in this case it is well to employ a piece of tape at one point at least to hold the severed end. However, I prefer to use a complete sheath of fabric. The flange 11 is preferably movable so that when advanced the hoop will be ejected from the body 10 of the reel. The resulting hoop shown at 13 is applied to the fixed member 14 of a suitable die and by means of the movable member 15 is compressed to the exact form required, after which it is cured by the aid of heat, whereupon the finished bead is built into a casing in the usual manner, resulting in a tire as shown in Fig. 6.

Owing to the irregular contour of the wire, the adjacent turns of the same are enabled to interlock snugly with each other as shown in Figs. 4 and 5, the surrounding tape having sufficient flexibility to permit a close interlocking of the same. No special care is taken in laying the same upon the reel shown in Figs. 12 and 13, since the wire will assume a stable and well interlocked condition under the pressure of the die.

It will be understood that these views are intended to be diagrammatic and illustrative only, especially Figs. 9 to 14 inclusive. It is especially to be noted that the winding of the hoop and forming of the same into the finished shape can, if desired, be performed simultaneously or by a single machine; also that the wrapping 12 can be omitted if desired inasmuch as the adhesion of the tape which surrounds the individual wires is sufficiently close for all or most practical purposes; it will be understood also that these various steps will ordinarily be effected by suitable machinery, although the process is the same as though performed by hand.

It is also within my invention to omit the tape 7 surrounding the individual wires and instead to embed the wires directly in a suitable rubber composition without internal fabric reinforcement. This embedding or surrounding may occur at other stages of the process; for example, it may be effected by injecting rubber composition after the winding shown in Figs. 12 and 13. It is also within the scope of my invention, when the tape 7 is used, to wrap the same about more than one wire at a time, for example in pairs as shown in Fig. 8 or in groups of three as shown in Fig. 7. This tape is most rapidly and cheaply applied by running through dies as shown in Fig. 11, but can if desired be wound spirally as shown in Fig. 15, and the resulting bead will be just as good. Also the fabric component of the tape can be omitted and only the rubber composition retained since the latter is the essential feature; indeed in the cured article the rubber penetrates the fabric in such a way that the latter is merely submerged in the same way as the wires themselves, although the fabric is of advantage in cushioning the wires apart and preventing internal friction.

In all these minor variations, the essential characteristics of my invention are retained, namely the employment of a bead wire which has an irregular exterior so that adjacent wires may become interlocked strongly together but without any deflection of the core of that wire which shall form a point of weakness and give rise to longitudinal extension. I do not however restrict myself to the exact shapes, arrangements, steps, or order of procedure here shown except as expressly recited in the claims hereto annexed.

Having thus described my invention, what I claim is:

1. A reinforcement for the beads of pneumatic tires consisting of a wire having alternate round and flattened portions.

2. A bead for pneumatic tires comprising a plurality of parallel strands of beaded wire.

3. A bead for pneumatic tires comprising a plurality of parallel strands of wire having alternating portions of dissimilar cross section which are symmetrical about a common axis.

4. An element for use in constructing the beads of pneumatic tires consisting of a beaded wire having a wrapping of rubberized fabric.

5. An element for use in constructing the beads of pneumatic tires consisting of a wire having an undeflected axis and an irregular exterior, and a wrapping of rubberized fabric.

6. An element for use in constructing the beads of pneumatic tires consisting of a wire having alternate larger and smaller portions, and a wrapping of rubberized fabric around said wire.

7. An element for use in constructing the beads of pneumatic tires consisting of a wire having alternating round and flattened portions, and a wrapping of rubberized fabric around said wire.

8. A bead for pneumatic tires comprising a plurality of parallel strands of wire having alternating larger and smaller portions wherein the larger portions of each wire project laterally between the adjacent larger portions of adjacent wires, the axes of the wires being undeflected.

9. A bead for pneumatic tires comprising a plurality of parallel strands of wire having alternating round and flattened portions symmetrical about a common axis, the flattened portions of each wire projecting laterally toward the round portions of adjacent wires.

10. A bead for pneumatic tires comprising a plurality of parallel strands of wire having irregular exteriors and undeflected axes, the exterior irregularities of each wire interlocking with the irregularities of the adjacent wires, and a flexible composition embracing all said wires.

11. A bead for pneumatic tires comprising a plurality of parallel strands of wire having alternating larger and smaller portions and a sheath of rubberized material surrounding each wire, the larger portions of each wire interlocking with the smaller portions of the adjacent wires and the whole being held together by the adhesion of the rubberized material.

12. A bead for pneumatic tires comprising one or more wires wound a plurality of times to form a flexible hoop, each wire having alternating portions of dissimilar cross section which are symmetrical about the axis of the wire, such axis being undeflected and the exterior irregularities of the different terms interfitting, and flexible composition embracing said wires and holding them in place.

13. The process of making a reinforcement for pneumatic tire beads which contains the step of flattening a wire at intervals without deflecting the axis of such wire.

14. The process of making a reinforcement for pneumatic tire beads which contains the steps of first flattening spaced portions of a round flexible wire without deflecting the axis of said wire; second, wrapping such wire with rubberized fabric; and, third, winding a plurality of turns of said wire together to form a hoop of the required size and strength.

15. The process of making a reinforcement for pneumatic tire beads which contains the steps of, first, rendering irregular the surface of a flexible wire; second, applying to said wire a sheath containing a rubber composition; third, winding said wire a plurality of times around a form to produce a hoop; fourth, subjecting such hoop to lateral pressure whereby the irregularities of adjacent wires are caused to interlock and the exterior of the hoop is brought to finished size and shape; and, finally, subjecting the compressed hoop to heat whereby the rubber composition is cured.

In testimony whereof, I hereunto affix my signature.

HARVEY F. MARANVILLE.